US010693297B2

(12) United States Patent
Zhang et al.

(10) Patent No.: US 10,693,297 B2
(45) Date of Patent: Jun. 23, 2020

(54) CENTRALIZED MPPT EXITING AND SWITCHING METHOD AND APPLICATION THEREOF

(71) Applicant: SUNGROW POWER SUPPLY CO., LTD., Hefei, Anhui (CN)

(72) Inventors: Fenggang Zhang, Anhui (CN); Hua Ni, Anhui (CN); Qun Zheng, Anhui (CN); Yanhu Zhang, Anhui (CN); Bing Hu, Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 499 days.

(21) Appl. No.: 15/309,980

(22) PCT Filed: Jul. 15, 2014

(86) PCT No.: PCT/CN2014/082225
§ 371 (c)(1),
(2) Date: Nov. 9, 2016

(87) PCT Pub. No.: WO2016/008093
PCT Pub. Date: Jan. 21, 2016

(65) Prior Publication Data
US 2017/0264099 A1 Sep. 14, 2017

(51) Int. Cl.
*H02J 3/38* (2006.01)
*H02M 7/44* (2006.01)
*G05F 1/67* (2006.01)

(52) U.S. Cl.
CPC ............... *H02J 3/385* (2013.01); *G05F 1/67* (2013.01); *H02M 7/44* (2013.01); *Y02E 10/58* (2013.01)

(58) Field of Classification Search
CPC .... H01L 31/02021; H02J 3/385; H02S 40/32; H02S 50/00; Y10T 307/685; Y10T 307/501; Y02E 10/58
See application file for complete search history.

(56) References Cited

U.S. PATENT DOCUMENTS 9,219,363 B2 12/2015 Liu et al.
2009/0236917 A1 9/2009 Bettenwort et al.
(Continued)

FOREIGN PATENT DOCUMENTS

CN 101599721 A 12/2009
CN 102067437 A 5/2011
(Continued)

OTHER PUBLICATIONS

Decision to Grant a Patent for corresponding JP Application No. 2016573783; dated Sep. 12, 2017.
(Continued)

*Primary Examiner* — Rexford N Barnie
*Assistant Examiner* — Thai H Tran
(74) *Attorney, Agent, or Firm* — Cantor Colburn LLP

(57) ABSTRACT

Disclosed is a centralized MPPT exiting method for a photovoltaic inverter comprising multiple DC chopper circuits and one inverter circuit. The method comprises: when the photovoltaic inverter is in a centralized MPPT mode, MPPT control is implemented independently for each photovoltaic cell in a photovoltaic component and the maximum power point for each photovoltaic cell is obtained; a reference value of the maximum power point for each photovoltaic cell is determined according to the type of the multiple DC chopper circuits; whether the voltage difference between the other maximum power points and the reference value goes beyond an allowable voltage difference is judged and the operation of the DC chopper circuits connecting to the
(Continued)

photovoltaic cells with a voltage difference beyond the allowable voltage difference is recovered.

19 Claims, 5 Drawing Sheets

(56) References Cited

U.S. PATENT DOCUMENTS

| | | | |
|---|---|---|---|
| 2009/0283128 | A1 | 11/2009 | Zhang et al. |
| 2009/0284078 | A1* | 11/2009 | Zhang ................... G05F 1/67 307/82 |
| 2014/0005845 | A1* | 1/2014 | Thomas ................ H02J 3/385 700/291 |
| 2016/0261118 | A1 | 9/2016 | Scaletti et al. |

FOREIGN PATENT DOCUMENTS

| | | |
|---|---|---|
| CN | 102237690 A | 11/2011 |
| CN | 102457068 A | 5/2012 |
| CN | 103633661 A | 3/2014 |
| DE | 19919766 A1 | 11/2000 |
| EP | 2104200 A1 | 9/2009 |
| EP | 3061174 | 4/2015 |
| JP | 2011521363 A | 7/2011 |
| JP | 2011164964 A | 8/2011 |
| JP | 2012137830 A | 7/2012 |
| JP | 5857193 B2 | 2/2016 |
| WO | 2005112551 A2 | 12/2005 |
| WO | 2009140551 A2 | 11/2009 |
| WO | 2012157329 A1 | 11/2012 |
| WO | 2013094839 A1 | 6/2013 |
| WO | 2014039120 A1 | 3/2014 |

OTHER PUBLICATIONS

SIPO First Office Action for corresponding CN Application No. 201480005701.2; dated Jul. 4, 2017.
International Search Report corresponding to Application No. PCT/CN2014/082225; dated Mar. 27, 2015, with English translation.
Australian Patent Examination Report No. 1 corresponding to Application No. 2014383916; dated Sep. 1, 2016.
Extended European Search Report corresponding to Application No. 14882792.6-1804/2993754 PCT/CN2014082225; dated Oct. 11, 2016.
European Notice of Opposition corresponding to Application No. 2993754B1; dated Jul. 4, 2019.

* cited by examiner

US 10,693,297 B2

CENTRALIZED MPPT EXITING AND SWITCHING METHOD AND APPLICATION THEREOF

This application is a national phase of International Application No. PCT/CN2014/082225, titled "CENTRALIZED MPPT EXITING AND SWITCHING METHOD AND APPLICATION THEREOF", filed on Jul. 15, 2014, which is incorporated herein by reference in its entirety.

FIELD

The present disclosure relates to the technical field of photovoltaic power generation, and specifically to a method for exiting or switching maximum power point tracking centralized modes and related applications.

BACKGROUND

Photovoltaic inverter is the energy conversion device in a photovoltaic power generation system, with which direct current (DC) generated by the photovoltaic cells is converted into alternative current (AC) and then sent into the power grid. The topological structure diagram of most low-medium power photovoltaic inverters is shown in FIG. 1, including an inverting circuit and multiple DC chopper circuits connected in parallel, where multiple photovoltaic strings are connected to the DC bus via the multiple DC chopper circuits and outputted via the inverting circuit.

Under the circumstance that the bus voltage meets inversion requirements, the inverter control system stops some DC chopper circuits with a relatively low transformation ratio from working so that the photovoltaic strings, which are connected with these DC chopper circuits, are connected directly in parallel to the DC bus to improve conversion efficiency of the whole system; afterwards the inverter control system tracks the overall maximum power point of the photovoltaic strings (which are directly connected in parallel with the DC bus via DC chopper circuits stopping operating) as a whole by adjusting the voltage of the DC bus to improve photoelectric conversion efficiency of the photovoltaic strings, which is defined as the Maximum Power Point Tracking (MPPT) centralized modes of the photovoltaic inverter.

In practice, when illumination intensity changes, maximum power points of each of the photovoltaic strings will deviate from the overall maximum power point of the photovoltaic strings, which will result in a decrease in MPPT efficiency of the photovoltaic inverter so as to be unable to achieve both a high conversion efficiency of the whole system and a high MPPT efficiency.

SUMMARY

Thereby, a method for exiting or switching MPPT centralized modes and related applications are provided by the present disclosure, to achieve both a high conversion efficiency of the whole system and a high MPPT efficiency.

A method for exiting a MPPT centralized mode of a photovoltaic inverter is provided, wherein the photovoltaic inverter includes a plurality of DC chopper circuits and an inverting circuit, and the inverting circuit is connected to an output side of the plurality of DC chopper circuits on which side the plurality of DC chopper circuits are connected in parallel to a DC bus. The method includes:

performing a MPPT control individually on each of photovoltaic strings to obtain a maximum power point for each of the photovoltaic strings, when the photovoltaic inverter is operating in the MPPT centralized mode, where the photovoltaic strings are connected in parallel to the DC bus via DC chopper circuits which stop operating;

determining a standard value for the maximum power points of the photovoltaic strings according to the type of the plurality of DC chopper circuits; and determining whether voltage differences between the voltages of the maximum power points and the standard value exceed a preset voltage difference, and restarting DC chopper circuits connected to photovoltaic strings with voltage differences exceeding the preset voltage difference.

Optionally, before performing a MPPT control individually on each of photovoltaic strings, the method includes: determining whether a voltage of the DC bus meets an inversion requirement and exiting the MPPT centralized mode if the voltage of the DC bus does not meet the inversion requirement.

Wherein, determining a standard value for the maximum power points of the photovoltaic strings includes: determining the maximum voltage among the voltages of the maximum power points of the photovoltaic strings, if the DC chopper circuits are boost chopper circuits.

Wherein, determining a standard value for the maximum power points of the photovoltaic strings includes determining the minimum voltage among the voltages of the maximum power points of the photovoltaic strings, if the DC chopper circuits are buck chopper circuits.

A method for switching MPPT centralized modes of a photovoltaic inverter is provided, wherein the photovoltaic inverter includes a plurality of DC chopper circuits and an inverting circuit, and the inverting circuit is connected to an output side of the plurality of DC chopper circuits on which side the plurality of DC chopper circuits are connected in parallel to a DC bus. The method includes a method for entering a MPPT centralized mode and the method for exiting the MPPT centralized mode according to any one of the above, wherein the method for entering a MPPT centralized mode includes:

obtaining a maximum power point for each of photovoltaic strings connecting to the plurality of DC chopper circuits;

determining a reference value for the maximum power points of the photovoltaic strings according to the type of the plurality of DC chopper circuits;

suspending DC chopper circuits connected with photovoltaic strings corresponding to the reference value; and determining whether voltage differences between the voltages of the maximum power points and the reference value exceed a preset voltage difference, and suspending DC chopper circuits connected to photovoltaic strings with voltage differences not exceeding the preset voltage difference.

Optionally, before obtaining a maximum power point for each of photovoltaic strings connected to the plurality of DC chopper circuits, the method further includes: determining whether a voltage of the bus meets an inversion requirement.

An apparatus for exiting a MPPT centralized mode of a photovoltaic inverter is provided, wherein the photovoltaic inverter includes a plurality of DC chopper circuits and an inverting circuit, and the inverting circuit is connected to an output side of the plurality of DC chopper circuits on which side the plurality of DC chopper circuits are connected in parallel to a DC bus. The apparatus includes:

a maximum power point determination unit, configured to perform a MPPT control individually on each of photovoltaic strings to obtain a maximum power point for each of the photovoltaic strings when the photovoltaic inverter is operating in the MPPT centralized mode, where the photovoltaic strings are connected in parallel to the DC bus via DC chopper circuits which stop operating;

a standard value determination unit connected with the maximum power point determination unit, configured to determine a standard value for the maximum power points of the photovoltaic strings according to the type of the plurality of DC chopper circuits; and a circuit restarting unit connected with the standard value determination unit, configured to determine whether voltage differences between the voltages of the maximum power points and the standard value exceed a preset voltage difference, and restart DC chopper circuits connected to photovoltaic strings with voltage differences exceeding the preset voltage difference.

Optionally, the apparatus for exiting MPPT centralized modes includes: a bus voltage determining unit connected with the maximum power point determination unit, configured to determine whether a voltage of the DC bus meets an inversion requirement and exit the MPPT centralized mode if the voltage of the DC bus does not meet the inversion requirement.

An inverter control system for a photovoltaic inverter is provided, wherein the photovoltaic inverter includes a plurality of DC chopper circuits and an inverting circuit, and the inverting circuit is connected to an output side of the plurality of DC chopper circuits on which side the plurality of DC chopper circuits are connected in parallel to a DC bus, wherein, the control system is configured to, when the photovoltaic inverter is operating in a MPPT centralized mode, perform a MPPT control individually on each of photovoltaic strings to obtain a maximum power point for each of the photovoltaic strings, where the photovoltaic strings are connected in parallel to the DC bus via DC chopper circuits which stop operating; determine a standard value for the maximum power points of the photovoltaic strings according to the type of the plurality of DC chopper circuits; and determine whether voltage differences between the voltages of the maximum power points and the standard value exceed a preset voltage difference, and restart DC chopper circuits connected to photovoltaic strings with voltage differences exceeding the preset voltage difference.

A photovoltaic inverter is provided, wherein the photovoltaic inverter includes a plurality of DC chopper circuits and an inverting circuit, and the inverting circuit is connected to an output side of the plurality of DC chopper circuits on which side the plurality of DC chopper circuits are connected in parallel to a DC bus, the photovoltaic inverter further including: the inverter control system described above.

It can be seen from the technical scheme above that in the present disclosure a maximum power point for each of the photovoltaic strings is obtained by performing an MPPT control individually on each of the photovoltaic strings and a standard value for the maximum power points is determined according to the type of the DC chopper circuits. Afterwards, the DC chopper circuits connected with the photovoltaic strings with voltage differences between the voltages of the maximum power points and the standard value exceeding the preset voltage difference are restarted, so as to improve MPPT efficiency of the photovoltaic inverter by improving photoelectric conversion efficiency of the photovoltaic strings. Thus, regardless of how the maximum power points of the photovoltaic strings deviate from the overall maximum power point of the photovoltaic strings as a whole, the embodiment can guarantees at least a DC chopper circuit with a low conversion efficiency does not work on the premise of improving MPPT efficiency of the whole photovoltaic inverter system, thereby achieving both a high conversion efficiency of the whole system and a high MPPT efficiency in the photovoltaic inverter.

BRIEF DESCRIPTION OF THE DRAWINGS

The drawings to be used in the descriptions of embodiments or the conventional technology are described briefly as follows, so that technical solutions according to the embodiments of the present disclosure or according to the conventional technology may become clearer. It is obvious that the drawings in the following descriptions only illustrate some embodiments of the present disclosure. For ordinary technical personnel in the art, other drawings may be obtained based on these drawings without any creative work.

DETAILED DESCRIPTION

Technical solutions according to embodiments of the present disclosure are described clearly and completely hereinafter in conjunction with the drawings. It is obvious that the described embodiments are only a part rather than all of the embodiments according to the present disclosure. Any other embodiments obtained by those ordinary technical personnel in the art based on the embodiments in the present disclosure without any creative work fall in the scope of the present disclosure.

First Embodiment

Figure 1:
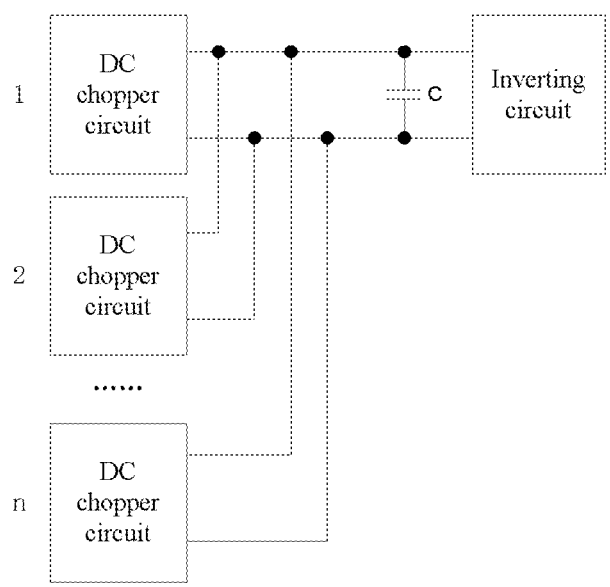
FIG. 1 is a schematic structural diagram of a photovoltaic inverter according to conventional technology.
Figure 2:
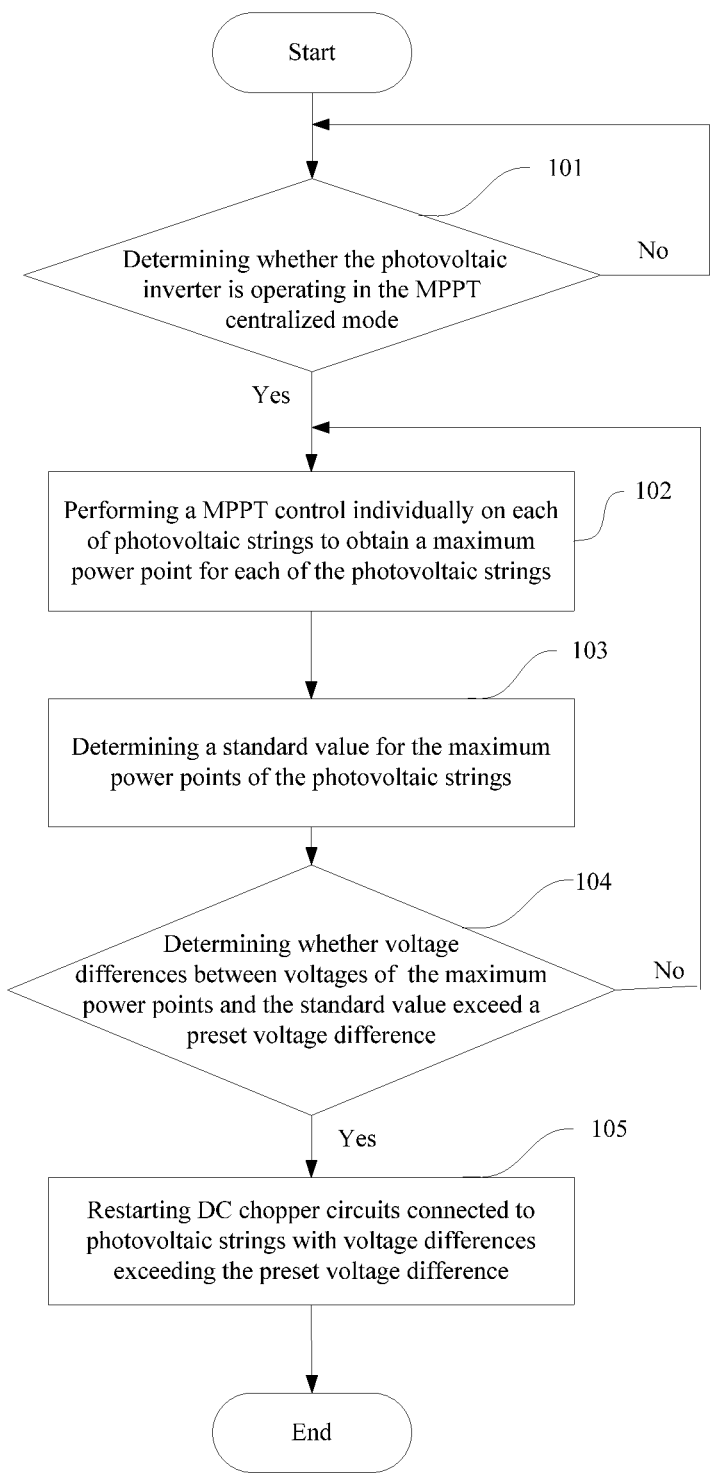
FIG. 2 is a flowchart of a method for exiting MPPT centralized modes in first embodiment of the present disclosure.

A method for exiting MPPT (Maximum Power Point Tracking) centralized modes of a photovoltaic inverter, is provided in first embodiment of the present disclosure, to achieve both a high conversion efficiency of the whole photovoltaic inverter system and a high MPPT efficiency. The photovoltaic inverter includes multiple DC chopper circuits and an inverting circuit, and the inverting circuit is connected to an output side of the multiple DC chopper circuits on which the multiple DC chopper circuits are connected in parallel to the DC bus. Referring to FIG. 2, the method includes steps 101-105.

At step 101, it is determined whether the photovoltaic inverter is in MPPT centralized modes. The method proceeds to step 102 if the photovoltaic inverter is in MPPT centralized modes, otherwise performing step 101 again.

At step 102, an MPPT control is performed individually on each of the photovoltaic strings to obtain a maximum power point for each of the photovoltaic strings, where the photovoltaic strings are directly connected in parallel to the DC bus via DC chopper circuits stopping operating.

At step 103, a standard value for the maximum power points of the photovoltaic strings is determined according to the type of the multiple DC chopper circuits. The standard value is the maximum voltage among the voltages of the maximum power points of the photovoltaic strings obtained in step 102, if the multiple DC chopper circuits are boost chopper circuits and the standard value is the minimum voltage among the voltages of the maximum power points of the photovoltaic strings obtained in step 102, if the multiple DC chopper circuits are buck chopper circuits.

At step 104, it is determined whether voltage difference between the voltages of the maximum power points and the standard value exceeds a preset voltage difference. Step 105 is performed if the voltage difference exceeds the preset voltage difference, otherwise returning to step 102.

At step 105: the DC chopper circuits connected with the photovoltaic strings with voltage differences larger than the preset voltage difference are restarted.

In order to be easily understood and applied for technical personnel in the art, the technical scheme of first embodiment is further described in detail.

Figure 3:
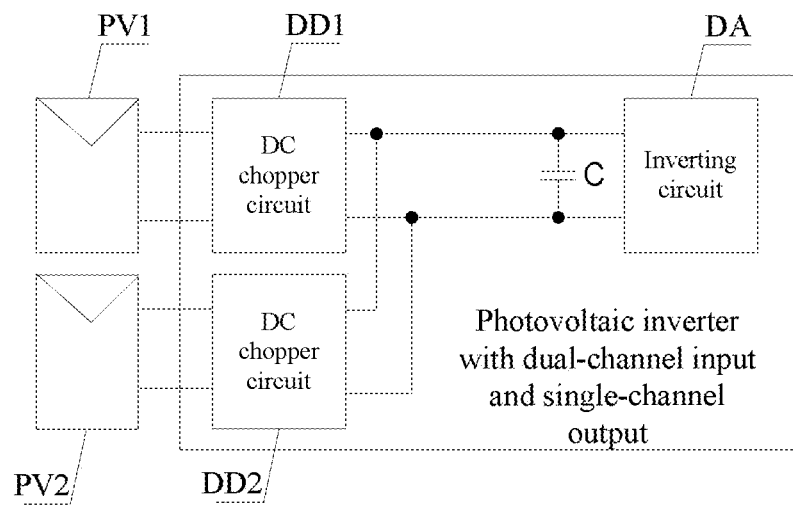
FIG. 3 is a schematic structural diagram of a photovoltaic inverter with dual-channel input and single-channel output according to conventional technology.
Figure 4:
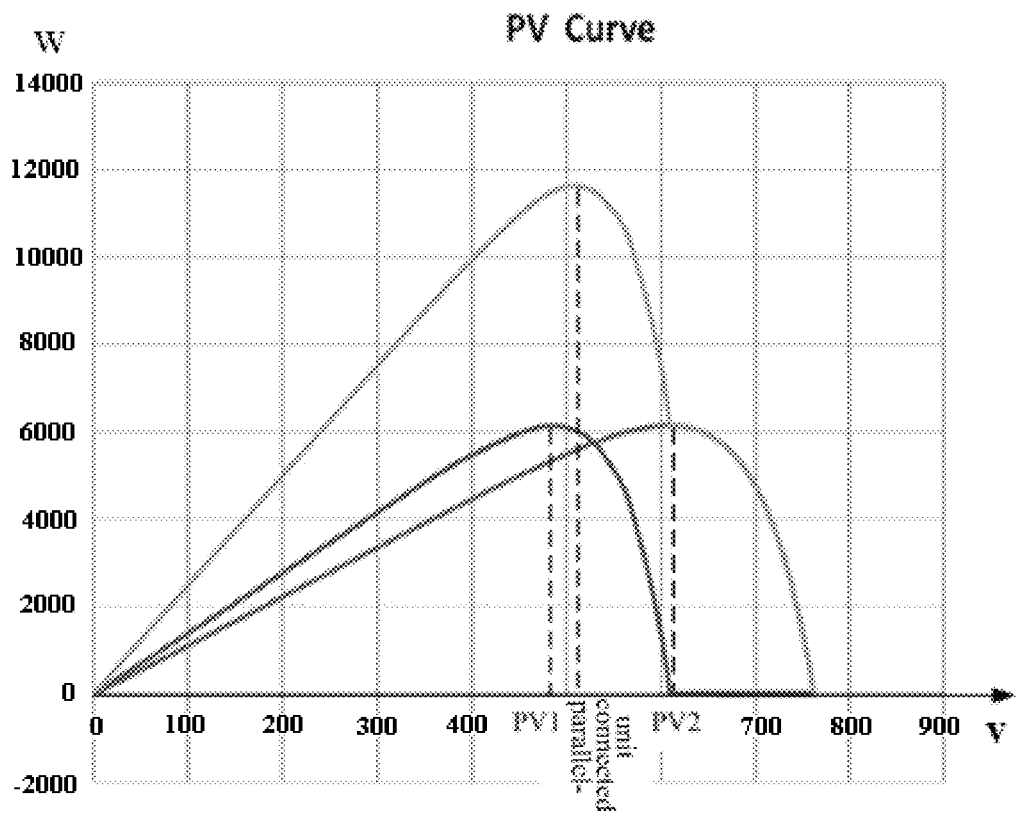
FIG. 4 is characteristic curves of power versus voltage of photovoltaic strings according to conventional technology.

A photovoltaic inverter with dual-channel input and single-channel output is illustrated in FIG. 3 for instance, which includes two DC chopper circuits and a inverting circuit. The inverting circuit is connected to an output side of the two DC chopper circuits on which the DC chopper circuits are connected in parallel to the DC bus. Specifically, when the photovoltaic strings are linked to the photovoltaic inverter, the first photovoltaic string PV1 and the second photovoltaic string PV2 are connected to the DC bus via the first DC chopper circuit DD1 and the second DC chopper circuit DD2 respectively and outputted via the inverting circuit DA.

When the photovoltaic inverter is not in MPPT centralized modes, existing inverter control system performs an MPPT control on PV1 individually according to the output voltage of PV1 (i.e. the inverter control system alters output power of PV1 by adjusting output voltage of PV1, and the output voltage of PV1 corresponding to the maximum output power of PV1 is the tracked maximum power point of PV1), and simultaneously performs an MPPT control on PV2 individually according to the output voltage of PV2 (i.e. the inverter control system alters output power of PV2 by adjusting output voltage of PV2, and the output voltage of PV2 corresponding to the maximum output power of PV2 is the tracked maximum power point of PV2).

When the photovoltaic inverter is in MPPT centralized modes (both DD1 and DD2 stop working and PV1 and PV2 are directly connected in parallel to the DC bus if assuming maximum power points of PV1 and PV2 are almost equal to each other), the existing inverter control system performs an MPPT control on the parallel-connected PV1 and PV2 (also referred to as parallel-connected unit of PV1 and PV2) according to the voltage of DC bus (i.e. the inverter control system alters output power of the parallel-connected unit by adjusting the voltage of DC bus, and the output voltage of the parallel-connected unit corresponding to the maximum output power thereof is the maximum power point of the parallel-connected unit. In this case, the maximum power points of PV1, PV2 and the parallel-connected unit are equal to each other and conversion efficiency of the photovoltaic inverter is improved due to the absence of electrical loss brought by DD1 and DD2 (the electrical loss is brought by conversion process in an inverter and corresponds to conversion efficiency of the inverter).

However, the maximum power points of PV1 and PV2 are no longer equal to the maximum power point of the parallel-connected unit (reference can be made to characteristic curves of power versus voltage of PV1, PV2 and the parallel-connected unit under the same conditions), if a deviation occurs to maximum power points of PV1 and PV2 due to influence of external factors such as sunshine intensity, environment temperature, load and so on. Therefore, each of the maximum power points of PV1 and PV2 cannot be achieved no matter how the MPPT control is performed on the parallel-connected unit by the inverter control system. Thus, the MPPT efficiency of the photovoltaic inverter is reduced.

In this embodiment, in order to improve MPPT efficiency of the photovoltaic inverter and guarantee that the whole conversion efficiency of the photovoltaic inverter is not too low, step 102 is performed when the photovoltaic inverter enters MPPT centralized modes. That is to say, an MPPT control is performed on each of PV1 and PV2 individually to obtain maximum power points of PV1 and PV2 when the photovoltaic inverter enters MPPT centralized modes.

Afterwards step 103 is performed, including determining a standard value for the maximum power points of PV1 and PV2 according to the type of DD1 and DD2. Specifically, the maximum voltage among the voltages of maximum power points of PV1 and PV2 is determined to be the standard value if DD1 and DD2 are boost chopper circuits, and the minimum voltage among the voltages of maximum power points of PV1 and PV2 is determined to be the standard value if DD1 and DD2 are buck chopper circuits. The standard value is selected taking conversion efficiency of the corresponding DC chopper circuits into consideration. For instance, conversion efficiency of DD2 is definitely very low, which is bad for improvement of the whole conversion efficiency of the photovoltaic inverter, if assuming maximum power point of PV2 is higher than that of PV1 and DD2 is restarted.

Afterwards step 104 is performed, including determining whether the difference between the voltages of the maximum power point of PV1 and the standard value exceeds a preset voltage difference if the standard value determined in step 103 is the voltage of the maximum power point of PV2. If the difference between the voltage of the maximum power point of PV1 and the standard value exceeds the preset voltage difference, DD1 is restarted. At this time, the inverter control system performs an MPPT control on PV1 individually according to the output voltage of PV1 again, which thus effectively avoids maximum power point of each of the photovoltaic strings in the parallel-connected unit deviating too much away from the maximum power point of the parallel-connected unit. Thus, the MPPT efficiency of the photovoltaic inverter is improved.

It can be seen from the descriptions above that in this embodiment a maximum power point for each of the photovoltaic strings is obtained by performing an MPPT control individually on each of the photovoltaic strings and a standard value for the maximum power points is determined according to the type of the DC chopper circuits. Afterwards, the DC chopper circuits connected with the photovoltaic strings with voltage differences between the voltages of the maximum power points and the standard value exceeding the preset voltage difference are restarted, so as to improve MPPT efficiency of the photovoltaic inverter by improving photoelectric conversion efficiency of the photovoltaic strings. Thus, regardless of how the maximum power points of the photovoltaic strings deviate from the overall maximum power point of the photovoltaic strings as a whole, the embodiment can guarantees at least a DC chopper circuit with a low conversion efficiency does not work on the premise of improving MPPT efficiency of the whole photovoltaic inverter system, thereby achieving both a high conversion efficiency of the whole system and a high MPPT efficiency in the photovoltaic inverter.

Second Embodiment

Based on first embodiment, another method for exiting MPPT centralized modes of a photovoltaic inverter is provided in second embodiment of the present disclosure, to achieve both a high conversion efficiency of the whole system and a high MPPT efficiency. Improvement to first embodiment in second embodiment lies in, before performing step 102, including: determining whether the DC bus voltage meets inversion requirements and performing step 102 if the DC bus voltage meets inversion requirements, otherwise exiting the MPPT centralized modes instantly. Thus the photovoltaic inverter would not operate unless the requirements for the MPPT centralized modes are met.

Wherein, determining whether the DC bus voltage meets inversion requirements can be performed by determining whether the DC bus voltage is higher than minimum operating voltage of the inverting circuit. The DC bus voltage does not meet inversion requirements if the DC bus voltage is lower than minimum operating voltage of the inverting circuit, otherwise the DC bus voltage meet inversion requirements.

Third Embodiment

A method for switching MPPT centralized modes of a photovoltaic inverter, is provided in third embodiment of the present disclosure, to achieve both a high conversion efficiency of the whole system and a high MPPT efficiency, including a method for entering MPPT centralized modes and any one of methods for exiting MPPT centralized modes described above.

Figure 5:
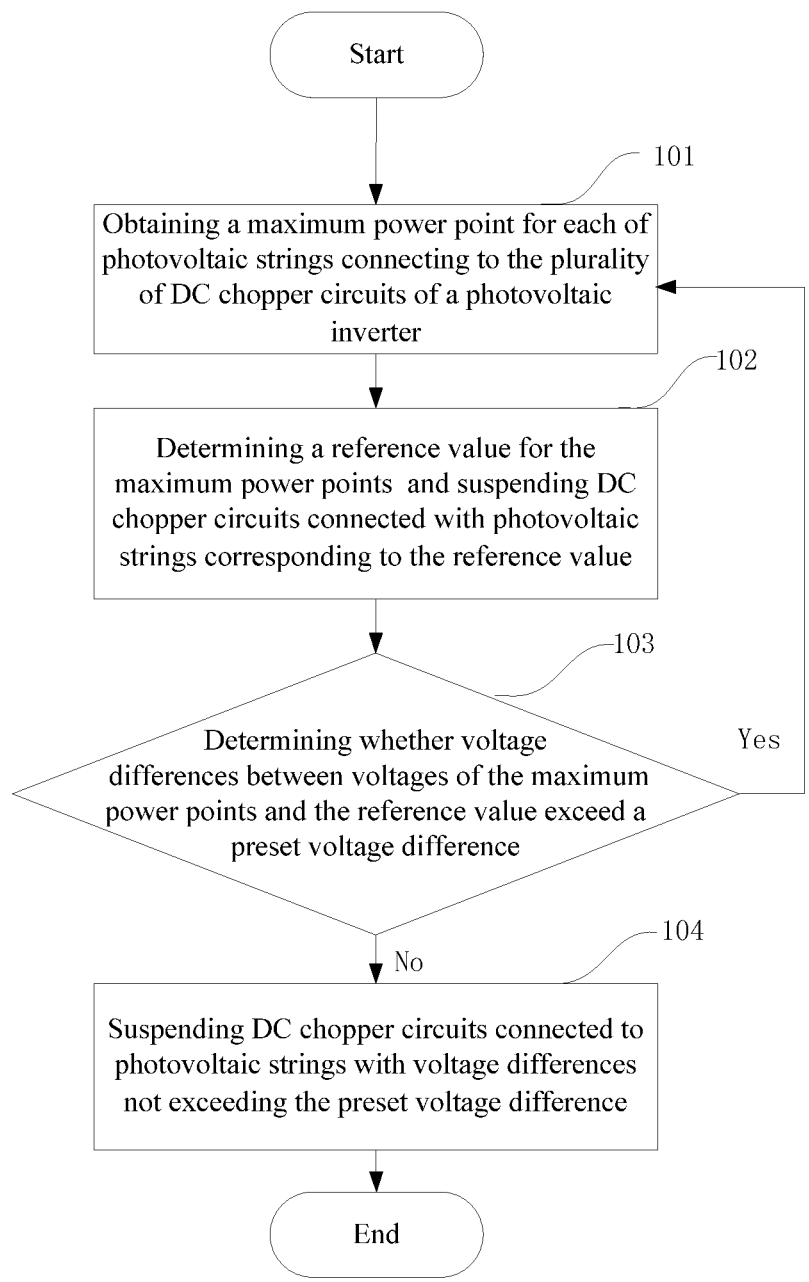
FIG. 5 is a flowchart of a method for entering MPPT centralized modes in third embodiment of the present disclosure.

Wherein, referring to FIG. 5, the method for entering MPPT centralized modes includes steps 101-104.

At step 101, the maximum power point of each of the photovoltaic strings connecting to the multiple DC chopper circuits of the photovoltaic inverter is obtained.

At step 102, a reference value for the maximum power points is determined according to the type of the multiple DC chopper circuits, and the DC chopper circuit connected with the photovoltaic string corresponding to the reference value is suspended. The reference value is the maximum voltage among the voltages of the maximum power points of the photovoltaic strings obtained in step 101, if the multiple DC chopper circuits are boost chopper circuits and the reference value is the minimum voltage among the voltages of the maximum power points of the photovoltaic strings obtained in step 101, if the multiple DC chopper circuits are buck chopper circuits;

At step 103, it is determined whether voltage difference between the voltages of the maximum power points and the reference value exceeds a preset voltage difference. Step 104 is performed if the voltage difference exceeds the preset voltage difference, otherwise returning to and performing step 101 again.

At step 104, DC chopper circuits connected with the photovoltaic strings with voltage differences not exceeding the preset voltage difference are suspended.

According to the descriptions above, because conversion efficiency of the DC chopper circuit corresponding to the photovoltaic string with a maximum power point equal or close to the reference value is relatively high, the DC chopper circuit is suspended. Thus the whole conversion efficiency of the photovoltaic inverter is improved without reducing MPPT efficiency.

In addition, preferably, before performing step 101, it is determined whether the DC bus voltage meets inversion requirements. If the DC bus voltage meets inversion requirements, step 101 is performed to avoid the photovoltaic working under a circumstance that the requirements of the MPPT centralized modes are not met.

It is noted that value of the preset voltage difference in third embodiment may equal to that in first embodiment, and can be adjusted according to practical conditions of the photovoltaic inverter.

Fourth Embodiment

Figure 6:
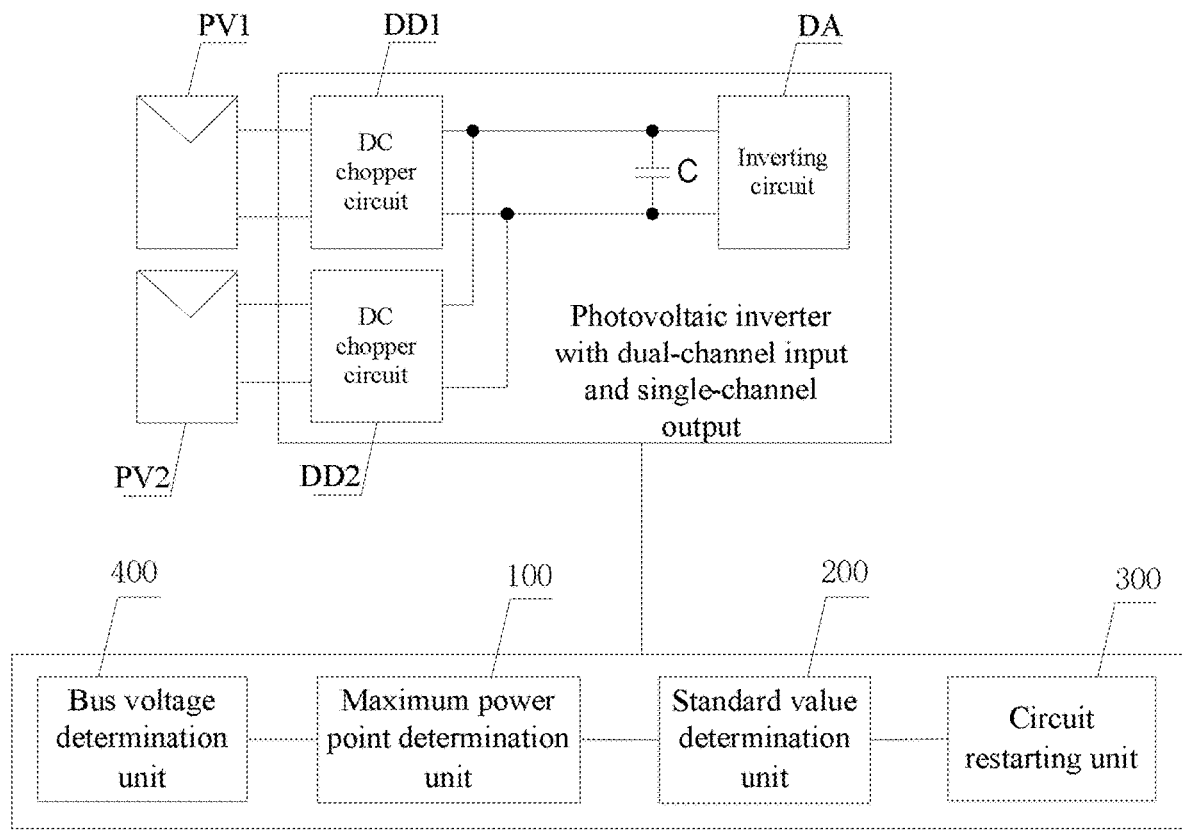
FIG. 6 is a schematic diagram of an apparatus for exiting MPPT centralized modes in fourth embodiment of the present disclosure.

An apparatus for exiting MPPT centralized modes of a photovoltaic inverter is provided in fourth embodiment of the present disclosure, to achieve both a high conversion efficiency of the whole system and a high MPPT efficiency. The photovoltaic inverter includes multiple DC chopper circuits and an inverting circuit, wherein the inverting circuit is connected to an output side of the multiple DC chopper circuits on which the multiple DC chopper circuits are connected in parallel to the DC bus. According to FIG. 6, the apparatus includes: a maximum power point determination unit 100, a standard value determination unit 200 and a circuit restarting unit 300.

The maximum power point determination unit 100 is configured to perform an MPPT control individually on each of the photovoltaic strings to obtain a maximum power point for each of the photovoltaic strings, in a case that the photovoltaic inverter is in MPPT centralized modes. The photovoltaic strings are connected in parallel to the DC bus via DC chopper circuits stopping operating.

The standard value determination unit 200, connected with the maximum power point determination unit 100, is configured to determine a standard value for the maximum points of the photovoltaic strings according to the type of the multiple DC chopper circuits.

The circuit restarting unit 300, connected with the standard value determination unit 200, is configured to determine whether the voltage difference between the voltages of the maximum power points and the standard value exceeds a preset voltage difference, and restart the DC chopper circuits connected with the photovoltaic strings with voltage differences larger than the preset voltage difference.

Optionally, the apparatus includes: a bus voltage determination unit 400, connected with the maximum power point determination unit 100, configured to determine whether the bus voltage meets inversion requirements and exit the MPPT centralized modes if the bus voltage fails to meet inversion requirements.

Fifth Embodiment

An inverter control system for a photovoltaic inverter is provided in fifth embodiment of the present disclosure, to achieve both a high conversion efficiency of the whole system and a high MPPT efficiency.

The photovoltaic inverter includes multiple DC chopper circuits and an inverting circuit, wherein the inverting circuit is connected to an output side of the multiple DC chopper circuits on which the multiple DC chopper circuits are connected in parallel to the DC bus.

The inverter control system is a control system configured to, when the photovoltaic inverter is in MPPT centralized modes, perform an MPPT control individually on each of the photovoltaic strings to obtain a maximum power point for each of the photovoltaic strings, where the photovoltaic strings are directly connected in parallel to the DC bus via DC chopper circuits stopping operating; determine a standard value for the maximum power points of the photovoltaic strings according to the type of the multiple DC chopper circuits; and determine whether the voltage difference between the standard value and the voltages of the rest maximum power points exceeds a preset voltage difference and restart the DC chopper circuits connected with the photovoltaic strings with voltage differences larger than the preset voltage difference.

In addition, a photovoltaic inverter using the inverter control system is provided in this embodiment. The main circuits of the photovoltaic inverter include multiple DC chopper circuit and an inverting circuit, wherein the inverting circuit is connected to an output side of the multiple DC chopper circuits on which the multiple DC chopper circuits are connected in parallel to the DC bus.

In summary, according to the present disclosure a maximum power point for each of the photovoltaic strings is obtained by performing an MPPT control individually on each of the photovoltaic strings and a standard value for the maximum power points is determined according to the type of the DC chopper circuits. Afterwards, the DC chopper circuits connected with the photovoltaic strings with voltage differences between the voltages of the maximum power points and the standard value exceeding the preset voltage difference are restarted, so as to improve MPPT efficiency of the photovoltaic inverter by improving photoelectric conversion efficiency of the photovoltaic strings. Thus, regardless of how the maximum power points of the photovoltaic strings deviate from the overall maximum power point of the photovoltaic strings as a whole, the embodiment can guarantees at least a DC chopper circuit with a low conversion efficiency does not work on the premise of improving MPPT efficiency of the whole photovoltaic inverter system, thereby achieving both a high conversion efficiency of the whole system and a high MPPT efficiency in the photovoltaic inverter.

Embodiments in the specification are described in a progressive manner, difference from other embodiments is emphasized in each embodiment, and similar parts in different embodiments can be referred to each other. The apparatus provided in an embodiment of the present disclosure is described briefly because it corresponds to the methods provided in embodiments of the present disclosure, and the description of the methods can be referred to for related points.

Above descriptions of embodiments of the present disclosure allow those skilled in the art to realize or apply the invention. Numerous modifications made to embodiments of the present disclosure are obvious to those skilled in the art, and general principles defined in the paper can be realized in other embodiments without deviation from technical essential or scope of the present invention. Thus, the present invention is not limited to embodiments in the paper, but falls within the widest scope consistent with principles and novelties provided in the disclosure in this paper.

The invention claimed is:

1. A method for exiting a Maximum Power Point Tracking (MPPT) centralized mode of a photovoltaic inverter, wherein the photovoltaic inverter comprises a plurality of direct current (DC) chopper circuits and an inverting circuit, the inverting circuit is connected to an output side of the plurality of DC chopper circuits on which side the plurality of DC chopper circuits are connected in parallel to a DC bus, and a plurality of photovoltaic strings are connected in parallel to the DC bus via the plurality of DC chopper circuits, the method comprising:
 obtaining a maximum power point for each of the plurality of photovoltaic strings, by performing a MPPT control individually on each of the plurality of photovoltaic strings in response to the photovoltaic inverter operating in the MPPT centralized mode and in response to the plurality of DC chopper circuits which are stopped from operating;
 determining output voltages of the plurality of photovoltaic strings, which correspond to the obtained maximum power points;
 determining one of the plurality of photovoltaic strings having a standard voltage value, which is a maximum or minimum one among the determined output voltages of the plurality of photovoltaic strings according to a type of the plurality of DC chopper circuits;
 determining whether a voltage difference between the output voltage of a further one of the plurality of photovoltaic strings and the standard voltage value of the one of the plurality of photovoltaic strings exceeds a preset voltage difference; and
 restarting the DC chopper circuit connected to the further one of the plurality of photovoltaic strings in response to the determined voltage difference exceeding the preset voltage difference.

2. The method for exiting the MPPT centralized mode according to claim 1, wherein, before performing the MPPT control individually on each of the plurality of photovoltaic strings, the method further comprises:
 determining whether a voltage of the DC bus meets an inversion requirement and exiting the MPPT centralized mode if the voltage of the DC bus does not meet the inversion requirement.

3. The method for exiting the MPPT centralized mode according to claim 2, wherein, if the DC chopper circuits are boost chopper circuits, the standard voltage value is the maximum one among the determined output voltages of the plurality of photovoltaic strings.

4. A method for switching Maximum Power Point Tracking (MPPT) centralized modes of a photovoltaic inverter, comprising a method for entering a MPPT centralized mode and the method for exiting the MPPT centralized mode according to claim 3, wherein the method for entering the MPPT centralized mode comprises:
 obtaining a further maximum power point for each of the plurality of photovoltaic strings;
 determining a reference value for the further maximum power points of the plurality of photovoltaic strings according to the type of the plurality of DC chopper circuits;
 suspending the DC chopper circuit connected with the photovoltaic string corresponding to the reference value; and
 determining whether voltage differences between voltages of the further maximum power points and the reference value exceed a further preset voltage difference, and suspending ones of the DC chopper circuits connected to ones of the plurality of photovoltaic strings with the voltage differences not exceeding the further preset voltage difference.

5. The method for exiting the MPPT centralized mode according to claim 2, wherein, if the DC chopper circuits are buck chopper circuits, the standard voltage value is the minimum one among the determined output voltages of the plurality of photovoltaic strings.

6. A method for switching Maximum Power Point Tracking (MPPT) centralized modes of a photovoltaic inverter, comprising a method for entering a MPPT centralized mode and the method for exiting the MPPT centralized mode according to claim 5, wherein the method for entering the MPPT centralized mode comprises:
   obtaining a further maximum power point for each of the plurality of photovoltaic strings;
   determining a reference value for the further maximum power points of the plurality of photovoltaic strings according to the type of the plurality of DC chopper circuits;
   suspending the DC chopper circuit connected with the photovoltaic string corresponding to the reference value; and
   determining whether voltage differences between voltages of the further maximum power points and the reference value exceed a further preset voltage difference, and suspending ones of the DC chopper circuits connected to ones of the plurality of photovoltaic strings with the voltage differences not exceeding the further preset voltage difference.

7. A method for switching Maximum Power Point Tracking (MPPT) centralized modes of a photovoltaic inverter, comprising a method for entering a MPPT centralized mode and the method for exiting the MPPT centralized mode according to claim 2, wherein the method for entering the MPPT centralized mode comprises:
   obtaining a further maximum power point for each of the plurality of photovoltaic strings;
   determining a reference value for the further maximum power points of the plurality of photovoltaic strings according to the type of the plurality of DC chopper circuits;
   suspending the DC chopper circuit connected with the photovoltaic string corresponding to the reference value; and
   determining whether voltage differences between voltages of the further maximum power points and the reference value exceed a further preset voltage difference, and suspending ones of the DC chopper circuits connected to ones of the plurality of photovoltaic strings with the voltage differences not exceeding the further preset voltage difference.

8. The method for exiting the MPPT centralized mode according to claim 7, wherein, before obtaining the further maximum power point for each of the plurality of photovoltaic strings, the method further comprises:
   determining whether the voltage of the bus meets the inversion requirement.

9. The method for exiting the MPPT centralized mode according to claim 1, wherein, if the DC chopper circuits are boost chopper circuits, the standard voltage value is the maximum one among the determined output voltages of the plurality of photovoltaic strings.

10. A method for switching Maximum Power Point Tracking (MPPT) centralized modes of a photovoltaic inverter, comprising a method for entering a MPPT centralized mode and the method for exiting the MPPT centralized mode according to claim 9, wherein the method for entering the MPPT centralized mode comprises:
    obtaining a further maximum power point for each of the plurality of photovoltaic strings;
    determining a reference value for the further maximum power points of the plurality of photovoltaic strings according to the type of the plurality of DC chopper circuits;
    suspending the DC chopper circuit connected with the photovoltaic string corresponding to the reference value; and
    determining whether voltage differences between voltages of the further maximum power points and the reference value exceed a further preset voltage difference, and suspending ones of the DC chopper circuits connected to ones of the plurality of photovoltaic strings with voltage differences not exceeding the further preset voltage difference.

11. The method for exiting the MPPT centralized mode according to claim 10, wherein, before obtaining the further maximum power point for each of the plurality of photovoltaic strings, the method further comprises:
    determining whether the voltage of the bus meets the inversion requirement.

12. The method for exiting the MPPT centralized mode according to claim 1, wherein, if the DC chopper circuits are buck chopper circuits, the standard voltage value is the minimum one among the determined output voltages of the plurality of photovoltaic strings.

13. A method for switching Maximum Power Point Tracking (MPPT) centralized modes of a photovoltaic inverter, comprising a method for entering a MPPT centralized mode and the method for exiting the MPPT centralized mode according to claim 12, wherein the method for entering the MPPT centralized mode comprises:
    obtaining a further maximum power point for each of the plurality of photovoltaic strings;
    determining a reference value for the further maximum power points of the plurality of photovoltaic strings according to the type of the plurality of DC chopper circuits;
    suspending the DC chopper circuit connected with the photovoltaic string corresponding to the reference value; and
    determining whether voltage differences between voltages of the further maximum power points and the reference value exceed a further preset voltage difference, and suspending ones of the DC chopper circuits connected to ones of the plurality of photovoltaic strings with the voltage differences not exceeding the further preset voltage difference.

14. The method for exiting the MPPT centralized mode according to claim 13, wherein, before obtaining the further maximum power point for each of the plurality of photovoltaic strings, the method further comprises:
    determining whether the voltage of the bus meets the inversion requirement.

15. A method for switching Maximum Power Point Tracking (MPPT) centralized modes of a photovoltaic inverter, comprising a method for entering a MPPT centralized mode and the method for exiting the MPPT centralized mode according to claim 1, wherein the method for entering the MPPT centralized mode comprises:
    obtaining a further maximum power point for each of the plurality of photovoltaic strings;
    determining a reference value for the further maximum power points of the plurality of photovoltaic strings according to the type of the plurality of DC chopper circuits;

suspending the DC chopper circuit connected with the photovoltaic string corresponding to the reference value; and determining whether voltage differences between voltages of the further maximum power points and the reference value exceed a further preset voltage difference, and suspending ones of the DC chopper circuits connected to ones of the plurality of photovoltaic strings with the voltage differences not exceeding the further preset voltage difference.

16. The method for exiting the MPPT centralized mode according to claim 15, wherein, before obtaining the further maximum power point for each of the plurality of photovoltaic strings, the method further comprises:

determining whether the voltage of the bus meets the inversion requirement.

17. An apparatus for exiting a Maximum Power Point Tracking (MPPT) centralized mode of a photovoltaic inverter, wherein the photovoltaic inverter comprises a plurality of direct current (DC) chopper circuits and an inverting circuit, the inverting circuit is connected to an output side of the plurality of DC chopper circuits on which side the plurality of DC chopper circuits are connected in parallel to a DC bus, and a plurality of photovoltaic strings are connected in parallel to the DC bus via the plurality of DC chopper circuits, the apparatus comprising:

a maximum power point determination unit, configured to obtain a maximum power point for each of the plurality of photovoltaic strings by performing a MPPT control individually on each of the plurality of photovoltaic strings in response to the photovoltaic inverter operating in the MPPT centralized mode and in response to the plurality of DC chopper circuits which are stopped from operating;

a standard value determination unit connected with the maximum power point determination unit, configured to determine output voltages of the plurality of photovoltaic strings, which correspond to the obtained maximum power points, and determine one of the plurality of photovoltaic strings having a standard voltage value, which is a maximum or minimum one among the determined output voltages of the plurality of photovoltaic strings according to a type of the plurality of DC chopper circuits; and a circuit restarting unit connected with the standard value determination unit, configured to determine whether a voltage difference between the output voltage of a further one of the plurality of photovoltaic strings and the standard voltage value of the one of the plurality of photovoltaic strings exceeds a preset voltage difference, and restart the DC chopper circuit connected to the further one of the plurality of photovoltaic strings in response to the determined voltage difference exceeding the preset voltage difference.

18. The apparatus for exiting the MPPT centralized mode according to claim 17, further comprising: a bus voltage determination unit connected with the maximum power point determination unit, configured to determine whether a voltage of the DC bus meets an inversion requirement and exit the MPPT centralized mode if the voltage of the DC bus does not meet the inversion requirement.

19. An inverter control system for a photovoltaic inverter, wherein the photovoltaic inverter comprises a plurality of direct current (DC) chopper circuits and an inverting circuit, the inverting circuit is connected to an output side of the plurality of DC chopper circuits on which side the plurality of DC chopper circuits are connected in parallel to a DC bus, and a plurality of photovoltaic strings are connected in parallel to the DC bus via the plurality of DC chopper circuits, wherein, the control system is configured to:

in response to the photovoltaic inverter operating in a MPPT centralized mode and in response to the plurality of DC chopper circuits which are stopped from operating, obtain a maximum power point for each of the plurality of photovoltaic strings, by performing a MPPT control individually on each of the plurality of photovoltaic strings; determine output voltages of the plurality of photovoltaic strings, which correspond to the obtained maximum power points; determine one of the plurality of photovoltaic strings having a standard voltage value, which is a maximum or minimum one among the determined output voltages of the plurality of photovoltaic strings according to a type of the plurality of DC chopper circuits; determine whether a voltage difference between the output voltage of a further one of the plurality of photovoltaic strings and the standard voltage value of the one of the plurality of photovoltaic strings exceeds a preset voltage difference, and restart the DC chopper circuit connected to the further one of the plurality of photovoltaic strings in response to the determined voltage difference exceeding the preset voltage difference.

\* \* \* \* \*